C. H. MICKELSEN.
VEHICLE BRAKE ATTACHMENT.
APPLICATION FILED APR. 4, 1911.
1,010,941.
Patented Dec. 5, 1911.
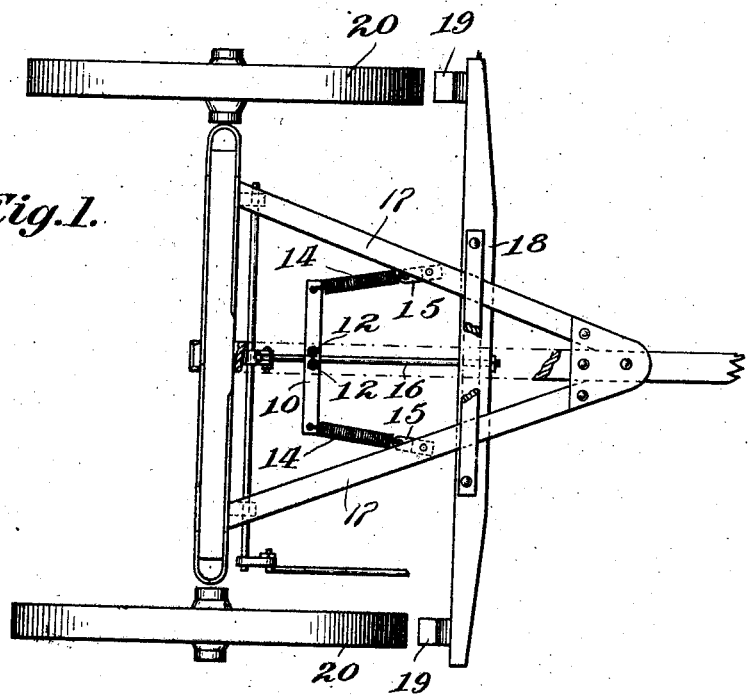
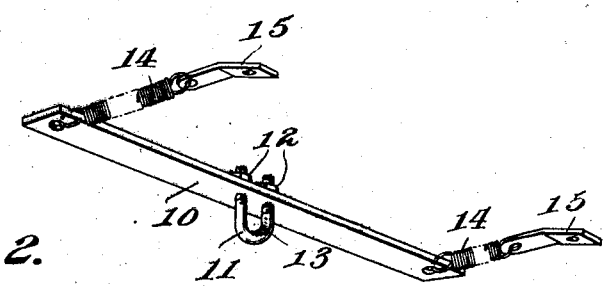
Witnesses
Inventor
Canute H. Mickelsen
By Victor J. Evans
Attorney

UNITED STATES PATENT OFFICE.

CANUTE H. MICKELSEN, OF BENCH, IDAHO.

VEHICLE BRAKE ATTACHMENT.

1,010,941. Specification of Letters Patent. Patented Dec. 5, 1911.

Application filed April 4, 1911. Serial No. 618,908.

*To all whom it may concern:*

Be it known that I, CANUTE H. MICKELSEN, a citizen of the United States, residing at Bench, in the county of Bannock and State of Idaho, have invented new and useful Improvements in Vehicle Brake Attachments, of which the following is a specification.

The invention relates to carriages and wagons, more particularly to the brakes for vehicles, and has for an object to provide an attachment to a vehicle brake for normally holding the brake shoes of the vehicle brake away from the wheels of the vehicle.

For the purpose mentioned, use is made of a U-shaped serrated lug for engagement with the brake rod, the said lug being secured to a cross bar and springs connected to the outer ends of the said cross bar and having their other ends secured to the hounds of the vehicle, thus tending to normally retain the brake shoes a distance from the tires of the vehicle wheels against which the brake shoes are adapted to operate when the brake is applied.

Reference is to be had to the accompanying drawings constituting a part of this specification, in which similar characters of reference denote corresponding parts in all the views, and in which, Figure 1 is a plan view disclosing a portion of the running gear of a vehicle and showing my device attached to the brake rod and the hounds thereof. Fig. 2 is a perspective view of my device and looking at the same from the under side thereof.

Referring more particularly to the views I provide a cross bar 10 having a U-shaped lug 11 mounted centrally thereof and depending therefrom, the said U-shaped lug being held in position on the cross bar by suitable nuts 12 threadedly engaging the ends of the lug and the said lug 11 having the inner surface thereof provided with serrations 13. Connected to the outer ends of the cross bar 10 are a plurality of retractile springs 14, the springs having plates 15 connected to their outer ends.

In the application of my device to the running gear of a vehicle, the U-shaped lug 11 is passed around the usual brake rod 16 of the running gear and is firmly secured to the brake rod by tightening the nuts 12 so that the serrations 13 of the lug will firmly grip the brake rod and the plates 15 are secured to the hounds 17 of the running gear on the under side thereof as disclosed in Fig. 1.

It will be now seen that the springs 14 tending to assume a retractable position, exert a pull on the brake rod 16 which in turn moves the brake beam 18 having the brake shoes 19 thereon so that the brake shoes will be spaced a distance from the wheels 20 of the vehicle. When it is desired to apply the brake shoes to wheels 20, the brake is operated in the usual manner and the force exerted to engage the shoes 19 with the wheels 20 must be of sufficient strength to overcome the retractile force of the springs 14.

Having thus fully described the invention, what I claim as new is:—

In a brake attachment for vehicles, a cross bar, a U-shaped lug adjustably mounted on the said cross bar and depending therefrom, a plurality of serrations formed on the inner surface of the said lug, the said lug encircling the brake rod of the vehicle so that the said serrations will securely grip the brake rod, retractile springs connected to the ends of the said cross bar and plates connected to the outer ends of the springs for connection with the hounds of the vehicle to normally position the brake shoes of the vehicle a distance from the wheels thereof.

In testimony whereof I affix my signature in presence of two witnesses.

CANUTE H. MICKELSEN.

Witnesses:
  AVOL PETERSON,
  R. E. LORD.